Nov. 6, 1962 W. DONNER ETAL 3,062,037
TEMPERATURE REGULATOR FOR CHROMATOGRAPHS
Filed April 22, 1957 3 Sheets-Sheet 1

INVENTORS.
WALTER DONNER
DON WAYNE CARLE

BY THEIR ATTORNEYS.
HARRIS, KIECH, FOSTER & HARRIS

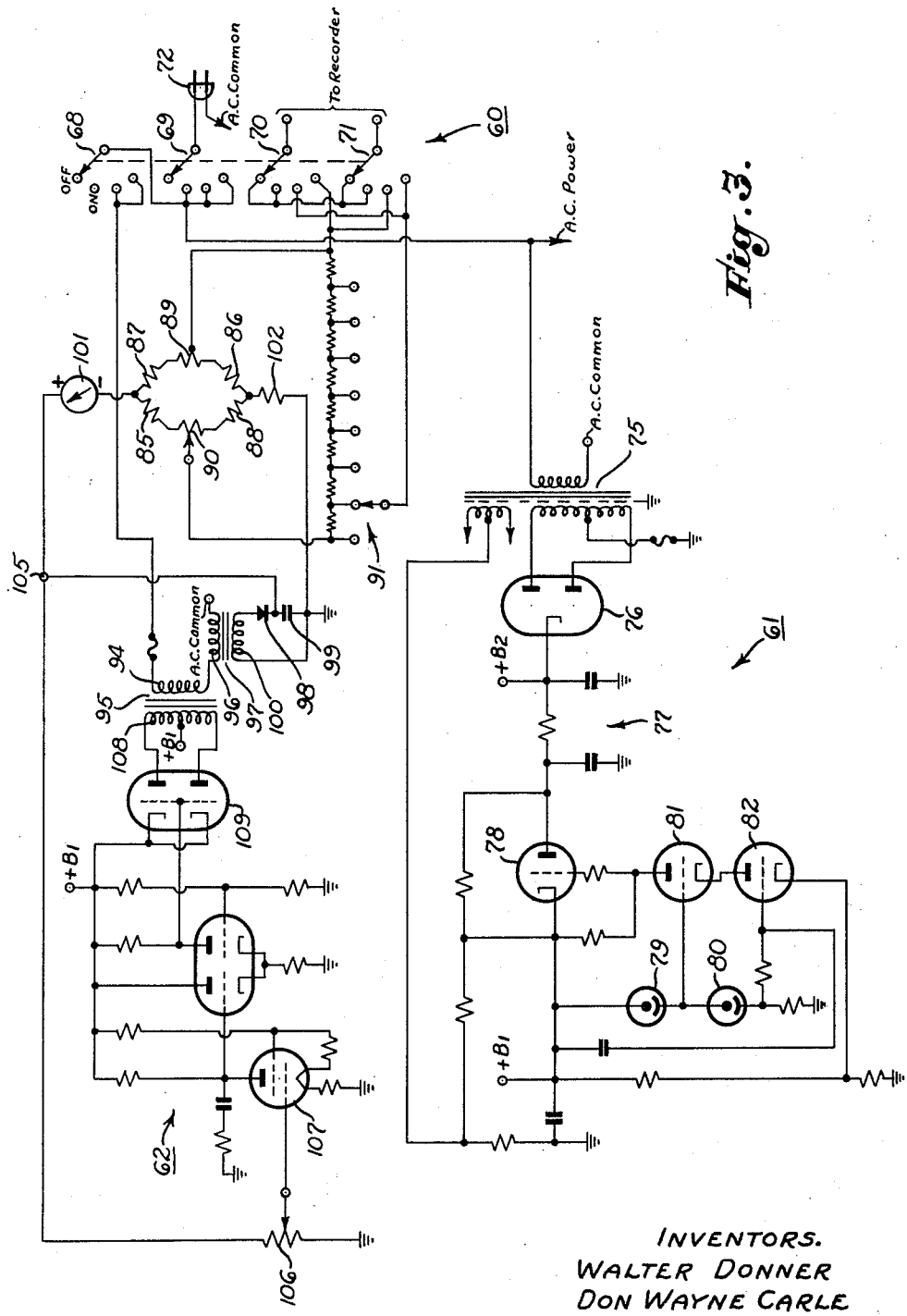

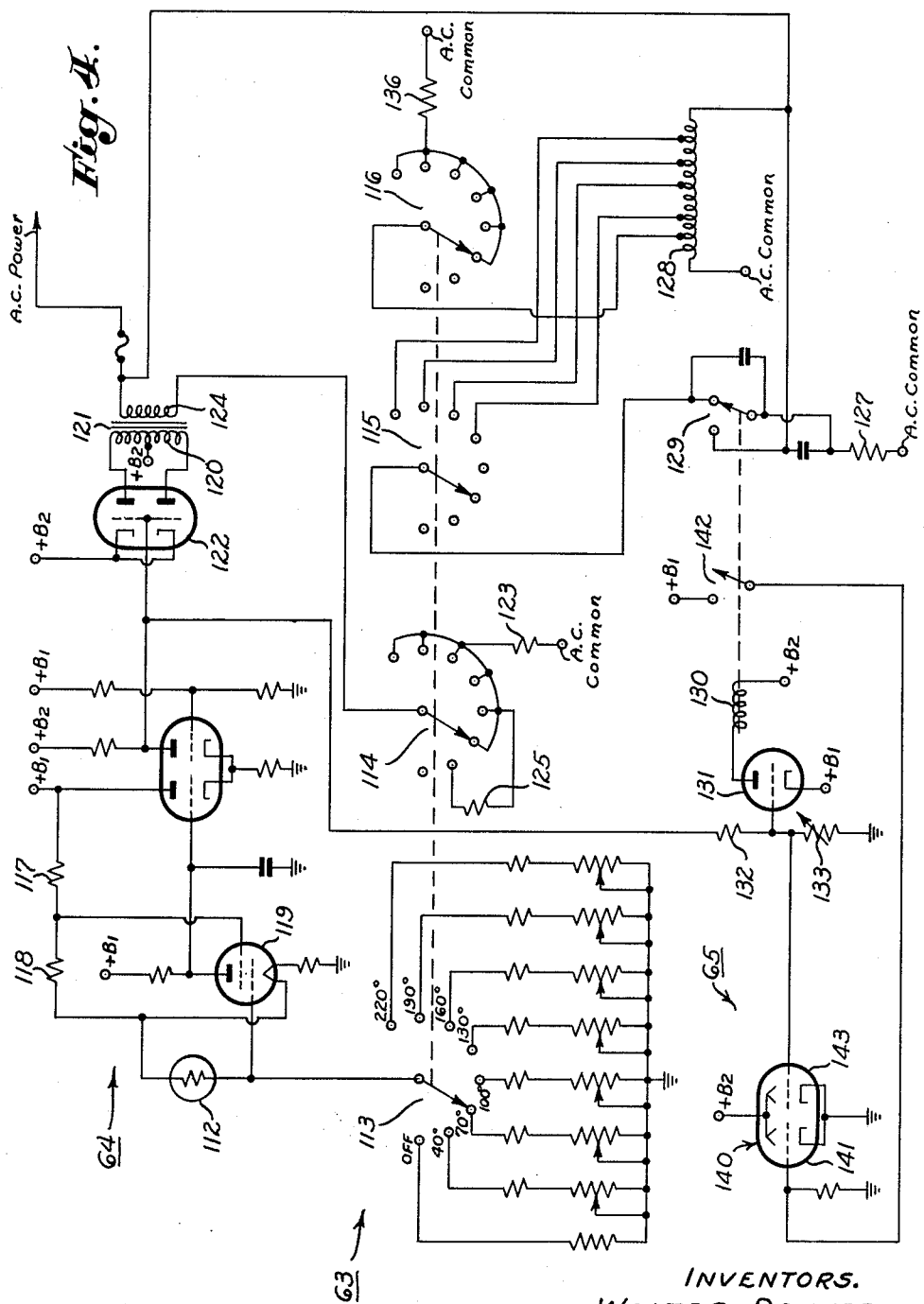

United States Patent Office 3,062,037
Patented Nov. 6, 1962

3,062,037
TEMPERATURE REGULATOR FOR CHROMATOGRAPHS
Walter Donner, Brea, and Don Wayne Carle, Whittier, Calif., assignors to Beckman Instruments, Inc., Fullerton, Calif., a corporation of California
Filed Apr. 22, 1957, Ser. No. 654,158
5 Claims. (Cl. 73—23)

This invention relates to gas chromatography and in particular to a gas chromatograph in which the effects of temperature variations are minimized or substantially eliminated so that highly reproducible test results may be obtained.

A chromatograph is used in determining the identity and proportions of the components of a fluid mixture. In a typical instrument, a carrier gas is continuously passed through a chamber or column which is packed with a granular material having particular adsorption characteristics or which is coated with a liquid having particular gas solubility characteristics. A small quantity of the sample to be analyzed is introduced into the carrier ahead of the column at a noted time. The various components of the sample are separated within the column and exit at different times, the elapsed time being an indication of the identity of the component. The presence and proportion of the various components in the exit carrier gas are detected by conventional means, such as by a thermal conductivity cell. This invention is concerned with an improved form of gas chromatograph having superior operating characteristics.

It is an obpject of the invention to provide a chromatograph which is operated at a constant temperature. A further object of the invention is to provide such a chromatograph which may be operated at any one of a plurality of preset temperatures, it being desirable to carry out the analysis of various fluids at different temperatures. A further object of the invention is to provide such a chromatograph in which the desired operating temperature may be selected by actuating a single control knob.

It is another object of the invention to provide a chromatograph which is small and compact and which requires only a short time to reach a new operating temperature following a change in the temperature set point. A further object of the invention is to provide such a chromatograph having visual indications of the temperature of the instrument relative to the desired temperature to indicate when a change in operating temperature has been achieved.

It is a further object of the invention to provide a chromatograph in which the quantity of heat supplied to the instrument may be continuously varied thereby eliminating stepwise changes in temperature which adversely affect test reproducibility. Another object of the invention is to provide unique circuits for controlling the power transferred to the heating units and the detector unit. A further object of the invention is to provide a chromatograph in which the continuously variable heating unit is supplemented by an auxiliary heating unit which may be operated at high power permitting rapid achievement of new operating temperature set points.

It is an object of the invention to provide a chromatograph in which the temperature sensitive components are mounted in close thermal contact with each other and with the heating units for facilitating rapid and continuous temperature control. Another object of the invention is to provide such a chromatograph in which the heating units, chromatographic column, detector unit and temperature sensing element are fixed to a common mount which has high thermal conductance, i.e., has low impedance to heat flow, for eliminating thermal gradients in the components. A further object of the invention is to provide such a chromatograph in which the common mount is a metallic plate, such as aluminum, having the heating units mounted on one side thereof and the other components mounted on the other side.

It is another object of the invention to provide a chromatograph in which the carrier gas is divided into two branches with one branch leading to the detector unit through the chromatographic column and the other branch leading directly to the detector unit so that pressure drops occurring across the column do not affect the output of the instrument.

A further object of the invention is to provide such a chromatograph having flow restrictors in each of the branches with the impedance of the flow restrictors being considerably greater than the impedance of the column.

The invention also comprises novel details of construction and novel combinations and arrangements of parts, which will more fully appear in the course of the following description. While the features of the invention are described in conjunction with a gas chromatograph, it is to be understood that they are applicable to other similar types of instruments and circuits, and in particular to instruments in which a sample must flow through a temperature-controlled analysis passage or chamber. The drawings merely show and the description merely describes a preferred embodiment of the present invention which is given by way of illustration or example.

Figure 5:
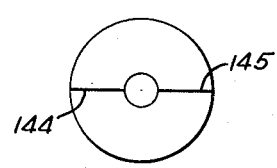
Figure 6:
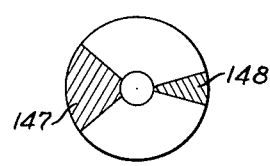
Figure 7:
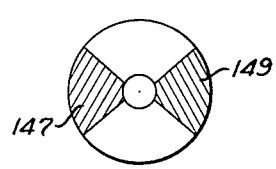

FIGS. 3 and 4 comprise an electrical schematic diagram of the instrument of the invention; and FIGS. 5, 6 and 7 show the visual indicator of the invention in three different conditions.

Figure 1:
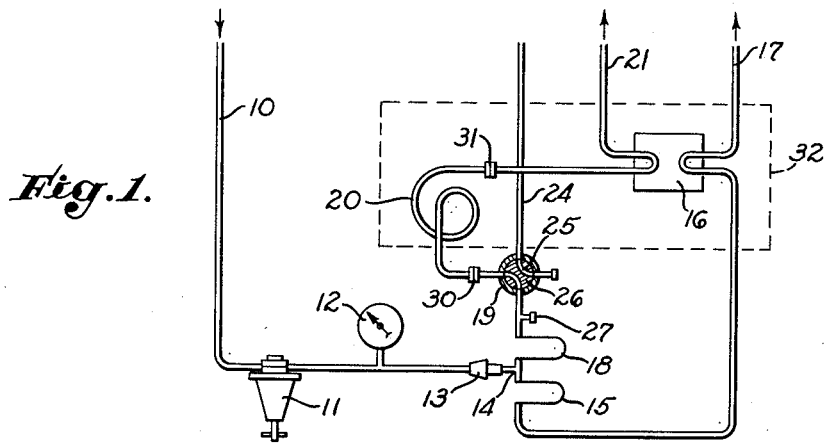
FIG. 1 is a schematic diagram of a a gas chromatograph embodying the teachings of the invention.

The gas chromatograph of the invention, as shown in FIG. 1, includes a carrier gas inlet line 10, a pressure regulator 11, a pressure gauge 12 for indicating the outlet pressure of the regulator 11 and a filter 13 in the line between the pressure regulator and a T junction 14. The carrier gas from the inlet line is divided at the T junction 14 with one branch leading through a flow restrictor 15 and the reference chamber of a detector cell 16 to an exhaust line 17. The other branch passes through another flow restrictor 18, a sample introducing valve 19, a chromatographic column 20 and the sample chamber of the detector cell 16 to an exhaust 21.

The flow restrictors 15 and 18 are intended to provide an impedance to fluid flow therethrough and may have any suitable form, such as a capillary orifice or an elongated tube. Such a flow restrictor will have a substantially fixed impedance which is reproducible over a long period of time.

A predetermined quantity of a sample may be introduced into the carrier gas by the sample introducing valve 19. A line 24, which may first be evacuated, is filled with the sample to any desired pressure, thereby leaving a predetermined quantity of the sample in a passage 25 in a core 26 of the valve. The core is then rotated 180° to place the passage 25 in line between the flow restrictor 18 and the column 20, thus introducing the sample into the sample line. An alternative sample injection fitting 27 is also in the line between the flow restrictor 18 and the column 20. This fitting is provided with a heavy rubber septum which may be pierced by the needle of a hypodermic syringe permitting introduction of samples, particularly liquids, into the sample line.

The column 20 may be a length of tubing packed with a granular material which is treated to have particular gas absorbing or adsorbing characteristics. The tubing may be bent to any form but is preferably a flat, multi-turn spiral and is provided with connectors 30, 31 so that columns of different characteristics may be substituted into the instrument.

The detector cell 16 may be a conventional thermal conductivity cell having two identical chambers with identical temperature sensitive elements positioned in each chamber. These elements are preferably connected in a bridge circuit so that differences in temperatures of the elements caused by differences in the cooling properties of the sample and reference gas streams passing through the chambers will be reflected in the output of the bridge. When the cooling properties or thermal conductivities of the carrier gas and a component of the sample gas are different, an indication will be obtained when such component passes through the detector cell. The time lapse between introduction of the sample and passage of a particular component through the detector cell is an indication of the identity of the component and the magnitude of the indicated output of the detector cell is a measure of the relative amount of the component in the sample.

The flow impedances of the flow restrictors 15 and 18 are made large relative to the flow impedance of the column 20 so as to substantially equalize the steady state and dynamic flow conditions in both chambers of the detector. The two restrictors may be identical with identical flow impedances and, since such impedance is substantially larger than that of a column, satisfactory operation will be obtained. However, it is preferred to make the impedance of the restrictor 15 equal to that of the restrictor 18 plus the column 20 providing equivalent flow conditions in both the sample and reference branches. Thus it is seen that the use of two gas flow branches with fixed flow restrictors in each branch substantially eliminates errors previously resulting from variations in inlet flow characteristics and reaction column flow characteristics, since such effects influence both chambers of the detector substantially equally and hence do not appreciably upset the balance of the bridge. The indicated output of a gas chromatograph is a function of the temperature of the column and the temperature of the detector cell. Moreover, the zero-drift of the instrument is largely dependent on the degree of temperature regulation of the detector cell. Hence, in order to obtain reproducible results, it is necessary to operate the instrument at a known and substantially constant temperature. Furthermore, different mixtures are best analyzed at different temperatures and, therefore, it is desirable to have an instrument which may be operated at any one of a plurality of known operating temperatures. Therefore, most gas chromatographs incorporate some form of heating unit and some form of temperature control. The present invention contemplates a temperature controlled gas chromatograph having an unusually compact physical arrangement of components, and a temperature sensing and continuous heat control circuit for accurately maintaining the desired operating temperature. Instruments embodying the present invention have a greatly improved signal output stability and up to ten-fold improvement in zero-drift as compared with known prior instruments.

An important feature of the invention is the conductive coupling together of the thermally controlled elements of the instrument. This construction provides extremely close thermal coupling as contrasted with instruments of the prior art which have used convective coupling, or heat transfer by means of circulating air.

The column 20 and the detector cell 16 are mounted within a thermally insulated box which is indicated by a dashed line 32 in FIG. 1. A preferred form for the box is shown in detail in FIG. 2 and includes mating top 36 and bottom 37 which may be clamped together to form the enclosure for the column 20 and detector cell 16. The top 36 has spaced inner and outer walls 38, 39 with the space between the walls filled with a good thermal insulator 40. The bottom 37 is constructed similarly to the top 36 with a portion of the inner wall being replaced by a mounting plate 41 which is composed of a material having high thermal conductivity such as a metal, aluminum being a preferred material. The mounting plate 41 is of substantial thickness so that the total effective thermal conductance from any portion of the plate to any other will be high. The coil 20 is mounted on the plate 41 with substantially the entire length of the coil in direct physical contact with the plate and preferably is clamped to the plate with a bar 45 and wing-nut and screw assemblies 46. The detector cell 16 may also be mounted directly on the plate 41 but is preferably mounted on an intermediate plate 42 which in turn is mounted on the mounting plate 41. The intermediate plate should also be of a material having high thermal conductivity, such as aluminum, and is provided with an opening 43 in which a temperature sensing element 44 may be positioned, so as to be thermally adjacent the coil 20 and the cell 16. An electric heating unit 47 is mounted in close contact with the underside of the plate 41 with electrical connections being made to the heating unit through a cable 48, the unit preferably being of the flat, extended-area type.

The carrier gas containing the sample to be analyzed flows into the column 20 from the valve 19 at 49, then into the sample chamber of the detector cell at 49a and out the exhaust 21. The carrier gas from the other branch flows from the restrictor 15 into the reference chamber of the detector cell at 50 and out the exhaust 17. Electrical connections 51, 52 permit coupling the resistances of the detector cell into the control circuitry.

The mounting of the heating unit, the column and the detector cell on a common plate having high thermal conductance provides very rapid heat transfer from the heating unit to the other components and results in very short time delays when the operating temperature is being changed. Furthermore, the entire column is at substantially the same temperature since there is direct heat transfer by conduction from the heating unit through the mounting plate to all portions of the column, eliminating thermal gradients along the column. Because of the close thermal coupling between the components of the instrument within the enclosure, maximum local temperatures do not greatly exceed the nominal temperature at the column and detector. The close thermal coupling also permits the physical assembly to be quite compact and therefore the surface area of the enclosure is small. For these reasons, the heat loss is quite low and, therefore, low power heating units may be utilized.

The circuitry for controlling the power supplied to the heating unit and to the detector cell is shown in FIGS. 3 and 4. The power supplied to the heating units may be continuously varied by the control circuitry in order to maintain the temperature at the temperature sensing element 44 constant, thus eliminating swings in the operating temperature which would be caused by off-on operation of the heating units. The circuitry of FIG. 3 includes a main off-on switch 60, a voltage regulated power supply 61 and a detector bridge circuit 62. The circuitry of FIG. 4 includes an operating temperature set switch 63, a heater control circuit 64 and an indicating circuit 65.

The switch 60 has four sections 68, 69, 70, 71 which are operated simultaneously by the actuation of a single knob, alternating current power being supplied to the instrument through a plug 72 and section 69 of the switch. One side of the input power line, indicated as A.C. common, is connected directly to various points in the circuit, and the other side of the input line, indicated as A.C. power, is connected to the regulated power supply 61 and the heater control circuit 64 when the switch 60 is in its second, third and fourth positions, the first position being the off position.

The voltage regulated power supply 61 may be conventional and includes a power transformer 75, full wave rectifier 76, filter section 77, current control tube 78, gas-discharge voltage reference tubes 79, 80 and reference voltage amplifier tuebs 81 and 82. The regulated voltage appears at terminal +B1 and is connected throughout the circuit to other terminals indicated as +B1 and an unregulated voltage appears at terminal +B2 and is connected throughout the circuit to other terminals indicated as +B2.

The flow sensing elements of the detector cell are preferably connected in a bridge circuit such as that shown in FIG. 3, wherein resistances 85 and 86 are positioned in the reference chamber and resistances 87 and 88 are positioned in the sample chamber. The resistances 87 and 86 are joined by a center tapped resistor 89 and the resistances 85 and 88 are joined by a potentiometer 90 to form a balanced bridge circuit, the output of the bridge appearing across the arm of the potentiometer and the center tap of the resistor. The bridge output is connected to an indicator or recorder through switch sections 70, 71, the magnitude of the output being controlled by a stepped attenuator 91 with the potentiometer 90 providing means for zeroing the output. The input to the recorder is shorted when the switch sections 70, 71 are in positions 1 and 2 and positions 3 and 4 provide for reversing the polarity of the bridge output signal.

The bridge is energized through switch sections 69 and 68 when the switch 60 is in the third or fourth position, the A.C. line being connected across a primary winding 94 of a transformer 95 and a primary winding 96 of a transformer 97. The bridge is preferably operated with direct current, a rectifier 98 and filter capacitor 99 being coupled across a secondary winding 100 of the transformer 97 to provide the D.C. bridge current through a current meter 101, the bridge and a resistance 102.

The voltage supplied to the bridge at point 105 is also connected across a potentiometer 106, the arm of which serves as the input to a first tube 107 of a three-tube amplifier. A secondary winding 108 of the transformer 95 is the load for the third tube 109 of the amplifier, the variations in amplifier output controlling the impedance of the transformer 95 and, therefore, the voltage applied to the primary of the transformer 97.

In the tube 107, the voltage supplied from the arm of the potentiometer 106 is compared with the voltage developed at the cathode of the tube, the amplifier output being a function of the difference between these two voltages. The cathode voltage serves as a reference voltage so as to maintain the voltage at point 105 constant. Of course, the potentiometer 106 can be differently connected to the bridge circuit. For example, the potentiometer could be connected to the junction of the resistances 86 and 88, thereby providing a control voltage which is directly related to the current in the bridge rather than to the voltage across the bridge as was the case with point 105. The potentiometer 106 permits adjustment of the voltage supplied to the bridge and the meter 101 indicates the total current in the bridge.

In an alternative transformer circuit for energizing and stabilizing the bridge, a single transformer with a single primary winding may be substituted for the transformers 95 and 97. This transformer will have two secondary windings corresponding to the windings 108 and 100 of the transformers 95 and 97 respectively, and will function in the same manner as the latter transformer.

The heater control circuit 64 (FIG. 4) includes a three-tube amplifier having an input which is a function of the instantaneous value of a temperature sensing resistor 112 and the setting of the switch 63. The switch 63 has four sections, 113, 114, 115, 116 and eight operating positions, namely, off and seven particular operating temperatures. Resistors 117 and 118, the temperature sensing resistor 112 and switch section 113 are connected as a voltage divider between +B1 and ground, the voltage applied to the grid of a first tube 119 being a function of the value of the temperature sensing resistor and the particular resistance connected in circuit therewith by the switch section 113. The magnitudes of the resistances connected between the switch section 113 and ground are ordinarily set when the instrument is manufactured to provide the prescribed operating temperatures.

The grid voltage of the tube 119 is compared with the cathode voltage of the tube which serves as a reference voltage, to provide a difference voltage. A secondary winding 120 of a transformer 121 is connected as the load on a third tube 122 of the amplifier, the output of the amplifier thereby controlling the impedance of the transformer 121 and hence the power supplied to a resistance heating unit 123 which is connected in series with switch section 114 and a primary winding 124 of the transformer 121 across the A.C. supply. A resistor 125 is connected in series with the heating unit 123 by the switch section 114 for the 40° operating temperature as shown in FIG. 4.

Figure 2:
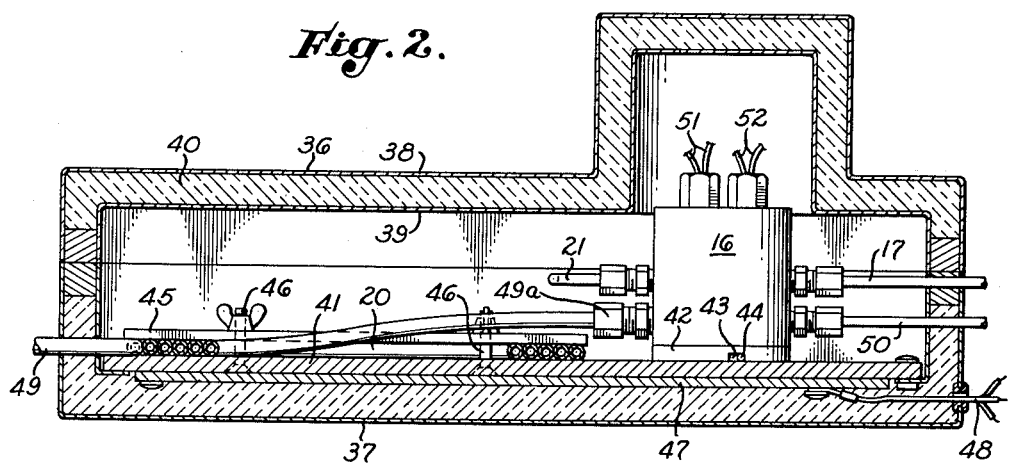
FIG. 2 is a vertical sectional view of the chromatograph of FIG. 1.

The temperature sensing resistor 112 of FIG. 4 corresponds to the temperature sensing element 44 of FIG. 2, the resistance of the resistor 112 varying continuously as a function of its temperature. The heating unit 123 of FIG. 4 corresponds to part of the heating unit 47 of FIG. 2, providing a continuously variable quantity of heat to the components of the instrument. Thus the instrument is maintained continuously at the desired operating temperature without wide swings in heat supplied and resultant temperature.

Since a wide range of operating temperatures is available with the instrument of the invention, it is preferred not to have the heating unit 123 supply all of the heat for each operating temperature. For the higher operating temperatures, an auxiliary resistance heating unit 127 is included in the heating unit 47 of FIG. 2, this auxiliary heating unit being energized from the A.C. line through a tapped transformer 128, switch section 115 of the switch 63 and switch section 129 of a relay 130. Thus, at the higher operating temperatures, a fixed amount of heat is supplied by the heating unit 127 and a continuously variable amount of heat is supplied by the heating unit 123 to maintain the instrument at the desired operating temperature.

The auxiliary heating unit 127 is also utilized for rapidly changing the instrument from a low operating temperature to a higher operating temperature. The relay 130 is connected as the plate load of an amplifier tube 131, the amplified difference signal from the tube 119 being coupled to the grid of the tube 131 through a voltage divider comprising a fixed resistor 132 and a variable resistor 133. When the difference signal is of a sense and magnitude indicating that the actual temperature of the instrument is substantially below the desired temperature, such as would be the case when switch 63 is moved from any given operating temperature position to any higher operating temperature position, the relay 130 is energized by the tube 131 and the switch section 129 is moved to the opposite position, thereby connecting the auxiliary heating unit 127 directly across the A.C. supply. Then the auxiliary heating unit 127 produces high heat output until the difference signal decreases to a predetermined value.

When the switch 63 is at the higher operating temperatures, switch section 116 supplies A.C. power from the transformer 128 to a resistance heating unit 136 positioned around the sample inlet line for prevention of condensation of liquids at this point.

In order to obtain accurate and reproducible results in the operation of the instrument of the invention it is essential that tests be made only after the components which are temperature controlled are at the desired operating temperature. Indications of the temperature status of the instrument are provided by the indicator circuit 65 which includes a dual cathode ray indicator tube 140.

which is sometimes referred to as a magic-eye tube. The grid of one section 141 of the indicator tube is connected to +B1 through a switch section 142 of the relay 130 when the relay is energized, thus providing a large positive bias for the grid when the auxiliary heater 127 is on high heat. The grid of the second section 143 of the indicator tube is coupled to the voltage divider circuit which supplies the signal to the tube 131, thus biasing the section 143 as a function of the difference signal generated in the heater control circuit 64.

FIGS. 5, 6 and 7 illustrate the appearance of the indicator tube for different temperature conditions of the instrument, the left hand portion relating to the status of the auxiliary heating unit and the right hand portion relating to the status of the continuously variable heating unit. When the actual temperature of the instrument is substantially below the desired temperature, the relay 130 will be energized an dthere will be a large positive signal applied to both sections of the indicator, resulting in extreme narrowing or disappearance of the dark sectors 144, 145 in each half of the indicator tube, as shown in FIG. 5. When the actual temperature of the instrument is substantially equal to the desired temperature, the relay 130 is de-energized, the grid of the section 141 returns to ground potential and a large dark sector 147 is provided on the left hand portion of the indicator as shown in FIG. 6. There will be an intermediate amount of current in the heating unit 123 and an intermediate bias on the section 143 producing a moderate size dark sector 148 on the right hand portion of FIG. 6. When the actual temperature of the instrument is greater than the desired temperature, as when the switch 63 has been set to a lower operating point, the relay 130 will be unenergized providing the large dark sector 147 as in FIG. 7 and there will be a minimum current in the heating unit 123 and a minimum signal on the section 143 producing a large dark sector 149 on the right hand portion of the indicator tube as shown in FIG. 7. Thus it is seen that an operator of the instrument of the invention has a continuous visual indication of the temperature status of the instrument and need not refer to thermometers in order to determine when a sample may be run, the indication of FIG. 6 being the proper indication for operation of the instrument.

Although an exemplary embodiment of the invention has been disclosed and discussed, it will be understood that other applications of the invention are possible and that the embodiments disclosed may be subjected to various changes, modifications and substitutions without necessarily departing from the spirit of the invention.

We claim as our invention:

1. In a chromatograph or the like having a temperature controlled analysis chamber, the combination of: a temperature sensitive element mounted thermally adjacent the chamber for producing a continuously variable temperature signal; a first electrical heating unit for supplying heat to the chamber; a second electrical heating unit for supplying heat to the chamber; a power source; a reference source for producing a reference signal; means for combining said reference signal and said temperature signal to produce an error signal; a continuously variable impedance for coupling said power source to said first heating unit; first control means for controlling the magnitude of said impedance as a function of said error signal for reducing said error signal to a minimum; second control means for coupling said power source to said second heating unit, said second control means being energized when said error signal exceeds a predetermined magnitude of a particular sense; two cathode ray indicator units for visually indicating the magnitude of an applied signal, at least one of said units being continuously variable; circuit means coupling said error signal to said continuously variable indicator unit; circuit means coupling said second control means to the other of said indicator units; and means for varying said reference signal.

2. In a gas chromatograph, the combination of: a heat-insulated chamber; a metallic plate means of high thermal conductance relative to its environment for producing a low resistance path for heat flow and mounted in said chamber; a chromatographic column element mounted on said plate means with substantially the entire length of said column in contact with said plate means; a chromatographic detector element mounted on said plate means; a temperature sensing element mounted on said plate means for producing a temperature signal as a function of the temperature of said plate means; a heater mounted on said plate means with at least a portion of the mass of said plate means between said heater and said elements; power means for energizing said heater; and control means responsive to said temperature signal for varying the heat generated by said heater for maintaining the temperature of said plate means substantially constant.

3. An instrument as defined in claim 2 in which said control means includes a control circuit for continuously varying the power coupled to said heater in proportion to the change in said temperature signal from a set point value.

4. An instrument as defined in claim 2 in which said heater comprises a first heater mounted on said plate means and a second heater mounted on said plate means adjacent said first heater, and in which said control means includes a control circuit for varying the power coupled to said first and second heaters and adjustable reference means for varying the temperature set point, with said control circuit continuously varying the power coupled to said first heater in proportion to the change in said temperature signal and stepwise varying the power coupled to said second heater when the temperature differs from the set point value by a predetermined magnitude.

5. In a gas chromatograph, the combination of: a heat insulated chamber; a chromatographic column mounted in said chamber; a heater for heating said column; a control circuit for varying the power coupled to said heater in proportion to changes in an input signal thereto; and a voltage divider circuit for producing said input signal, said divider circuit including a temperature sensor for producing a temperature signal as a function of the temperature adjacent said column and an adjustable reference resistance connected in series, with said input signal appearing intermediate said sensor and reference resistance.

References Cited in the file of this patent

UNITED STATES PATENTS

| 2,003,945 | Logan | June 4, 1935 |
| 2,528,626 | Wannamaker et al. | Nov. 7, 1950 |
| 2,638,571 | Schultz | May 12, 1953 |
| 2,683,793 | Gilmont et al. | July 13, 1954 |
| 2,769,076 | Bogdan | Oct. 30, 1956 |
| 2,826,908 | Skarstrom | Mar. 18, 1958 |
| 2,829,231 | Troost | Apr. 1, 1958 |

OTHER REFERENCES

Article: Gas Chromatography, by Dimbat et al., published in Analytical Chemistry, vol. 28, No. 3. March 1956, pages 290–296.

Book: Vapor Phase Chromatography, Desty, Butterworth's Scientific Publication, London, 1956, pages 213–216.

Article: Analyzing Hydrocarbon Mixtures, by Podbielniak and Preston, published in Oil & Gas Journal, Apr. 16, 1956, pp. 211–217.